United States Patent [19]
Trible

[11] Patent Number: 5,980,191
[45] Date of Patent: Nov. 9, 1999

[54] RECTANGULAR TUBE CLAMPING AND MANEUVERING APPARATUS

[76] Inventor: William Trible, 10365 Diane Ave., Buena Park, Calif. 90620

[21] Appl. No.: 08/784,273

[22] Filed: Jan. 15, 1997

[51] Int. Cl.⁶ ............................................. B66F 11/00
[52] U.S. Cl. ............................ 414/746.7; 414/745.1; 414/746.8; 414/762; 414/764; 414/765
[58] Field of Search ............................ 414/762, 763, 414/764, 765, 745.1, 745.3, 746.7, 746.8, 14, 16

[56] References Cited

U.S. PATENT DOCUMENTS

| | | |
|---|---|---|
| 266,997 | 11/1882 | Jones . |
| 1,315,392 | 9/1919 | Orvig . |
| 2,048,948 | 7/1936 | Postlewaite . |
| 2,655,066 | 10/1953 | Siegerist ........................................ 414/14 |
| 3,038,734 | 6/1962 | Else . |
| 3,090,237 | 5/1963 | Ongaro . |
| 3,490,665 | 1/1970 | Jonsson . |
| 3,944,203 | 3/1976 | Brekelbaum ............................. 269/296 |
| 4,068,545 | 1/1978 | Scheler ........................................ 414/16 |
| 4,264,267 | 4/1981 | Luben ..................................... 414/746.8 |
| 4,306,596 | 12/1981 | Kreibaum ............................... 414/746.8 |
| 4,413,415 | 11/1983 | Stovall . |
| 4,445,678 | 5/1984 | George . |
| 4,470,291 | 9/1984 | Gibb et al. . |
| 4,548,537 | 10/1985 | Kubotera et al. ..................... 414/746.8 |
| 4,583,432 | 4/1986 | Bricker . |
| 4,604,924 | 8/1986 | Cucchi et al. .............................. 414/16 |
| 4,619,310 | 10/1986 | Andoh et al. . |
| 4,624,611 | 11/1986 | Fabbri ........................................ 414/14 |
| 4,641,818 | 2/1987 | Bommart ................................... 269/43 |
| 4,676,425 | 6/1987 | Fujimura et al. .................... 414/746.8 |
| 4,709,603 | 12/1987 | Buck ........................................... 414/14 |
| 4,813,657 | 3/1989 | Todd ........................................ 269/22 |
| 5,005,813 | 4/1991 | Lawrence . |
| 5,016,507 | 5/1991 | Riera ........................................ 83/384 |
| 5,280,892 | 1/1994 | Smith ....................................... 269/75 |
| 5,337,875 | 8/1994 | Lee . |

*Primary Examiner*—Christopher P. Ellis
*Assistant Examiner*—Douglas Hess
*Attorney, Agent, or Firm*—Price Gess & Ubell

[57] ABSTRACT

A mounting apparatus is disclosed for securing and maneuvering an elongate tubing of general cross-section which permits longitudinal movement through the apparatus but inhibits lateral movement or vertical movement. The apparatus includes a channel for the tubing and two pair of opposed jaws which cooperate to limit the motion of a tubing held therein, and each jaw is provided a roller which permits the tubing to slide longitudinally through the apparatus while preventing lateral movement. The opposed jaws are mounted so as to open and close symmetrically about a centerline of the channel and the closing of the two pair of opposing jaws precisely centers the tubing on the centerline. The apparatus is rotatable, and is used in combination with a drive support unit to permit movement between the elongate tubing and an operation station for automated operation along the length of the tubing.

23 Claims, 8 Drawing Sheets

RECTANGULAR TUBE CLAMPING AND MANEUVERING APPARATUS

BACKGROUND OF THE INVENTION

1. Field of the Invention

The present invention relates to adjustable clamping mechanisms and, more particularly, to an adjustable clamping apparatus especially suited for securing and maneuvering both rectangular as well as circular and noncircular cross-sectional tubing.

2. Description of Related Art

Clamping mechanisms used for securing and maneuvering work pieces during machining operations are well known in the art, and the field is plentiful with various methods for clamping various shaped workpieces. Basic V-block supports are among the most common types of supports due to their ability to secure both circular and rectangular cross-sectional work pieces (see, for example, Lawrence, U.S. Pat. No. 5,005,813, FIG. 6). Other types of mounting apparatus include screw mountings applied in radial directions (see Bricker, U.S. Pat. No. 4,583,432, FIG. 6) and split V-blocks (see George, U.S. Pat. No. 4,445,678). These systems are either too unstable for some applications or are not adaptable to the various sizes and shapes of cross-sectional work pieces such as rectangular tubing.

When the end of a circular cross-section tubing is cut in a particular shape so as to conform or mate with another tubing or surface, known as "coping," the tubing is rotated adjacent a cutting instrument while the tubing is simultaneously moved back and forth to achieve the desired cut (see FIG. 1). Coping is used in architectural applications, structural applications, and any other application where a lattice of tubing is connected at acute angles. There currently exists machines which clamp and rotate circular tubing so that they may be cut in this manner and, for this reason, circular tubing is often preferred to other shapes of tubing. These machines rely on the characteristic of circular tubing which automatically centers the tubing for rotation when the tubing is laterally constrained. That is to say, when the circular tubing is rotated on its axis, a stationary cutting tool can be used to create the desired shape and the tubing will not wobble when rotated due to the proper centering. This characteristic is exclusive to circular tubing, whereas other shaped tubing will not automatically be rotationally centered in a restraining device. Because of the difficulty of centering a noncircular cross-sectional tubing such as a rectangular tubing, this type of tubing is difficult to cope. Rectangular cross-section tubing offers an artistic alternative to circular tubing, but heretofore it had usually been eschewed because the coping of rectangular tubing had to be performed manually. Manual coping introduces errors and waste, and is labor intensive, driving up the cost of using rectangular tubing. The difficulties in automating the coping of rectangular tubing lie in accurately centering the tubing and rotating the tubing adjacent a cutting instrument which may be fixed or difficult to maneuver. For these reasons, the use of rectangular tubing and other noncircular tubing is discouraged in favor of circular tubing.

The prior art lacks a system for clamping and maneuvering rectangular tubing which can accurately and automatically center the tubing and permit rotation about an axis such as would allow the rectangular tubing to be coped in an automated manner. The ideal system would preferably operate on circular, square, rectangular, as well as other cross-sectional tubing to provide versatility from a single system.

OBJECTS AND SUMMARY OF THE INVENTION

The preceding difficulties in the prior art have been overcome by the present invention, which comprises a rotatable clamping apparatus having a first pair of retractable opposed rollers operating in concert to grip opposite sides of a tubing specimen passing through the clamp, and a second pair of retractable opposed rollers operating in concert to grip opposite sides of the tubing in a direction traverse to the first pair of rollers. Each pair of rollers remain centered about an axis of rotation, such that any tubing which is symmetric about a plane between the rollers will be centered on the axis of rotation. When both pair of rollers are mounted to operate in perpendicular planes, geometric shapes with two perpendicular planes of symmetry, such as circles, squares, rectangles, ellipses, rhombuses and so on will be centered on the axis of rotation merely by clamping the rollers about the tubing. Rollers permit the tubing to slide longitudinally between the clamp while fixing the tubing laterally and vertically, allowing the tubing to be positioned between the two pairs of rollers. The tubing may move laterally between the rollers as the result of the clamping apparatus moving along the length of a stationary tube, or the tube moving past a stationary clamping apparatus. The clamping apparatus rotates along the tubing according to a preprogrammed cutting sequence to achieve the desired cut. The clamping apparatus is especially suited for rectangular tubing wherein each pair of rollers constrains opposite sides of the tubing and the rollers can be adjusted to center the tubing such that the rectangular tubing can be rotated about a centerline and the coping operation can be achieved by a fixed reference cutting instrument. The clamping system operates equally well on circular and other cross-sectional tubing, thereby providing an extremely versatile clamping system for use in the machining of various tubing specimens.

BRIEF DESCRIPTION OF THE DRAWINGS

For a better understanding of the present invention, reference is made to the following description of the exemplary embodiments considered in conjunction with the accompanying drawings, in which.

DESCRIPTION OF THE PREFERRED EMBODIMENTS

The following description is provided to enable any person skilled in the art to make and use the invention and sets forth the best modes contemplated by the inventor of carrying out his invention.

Figure 1:
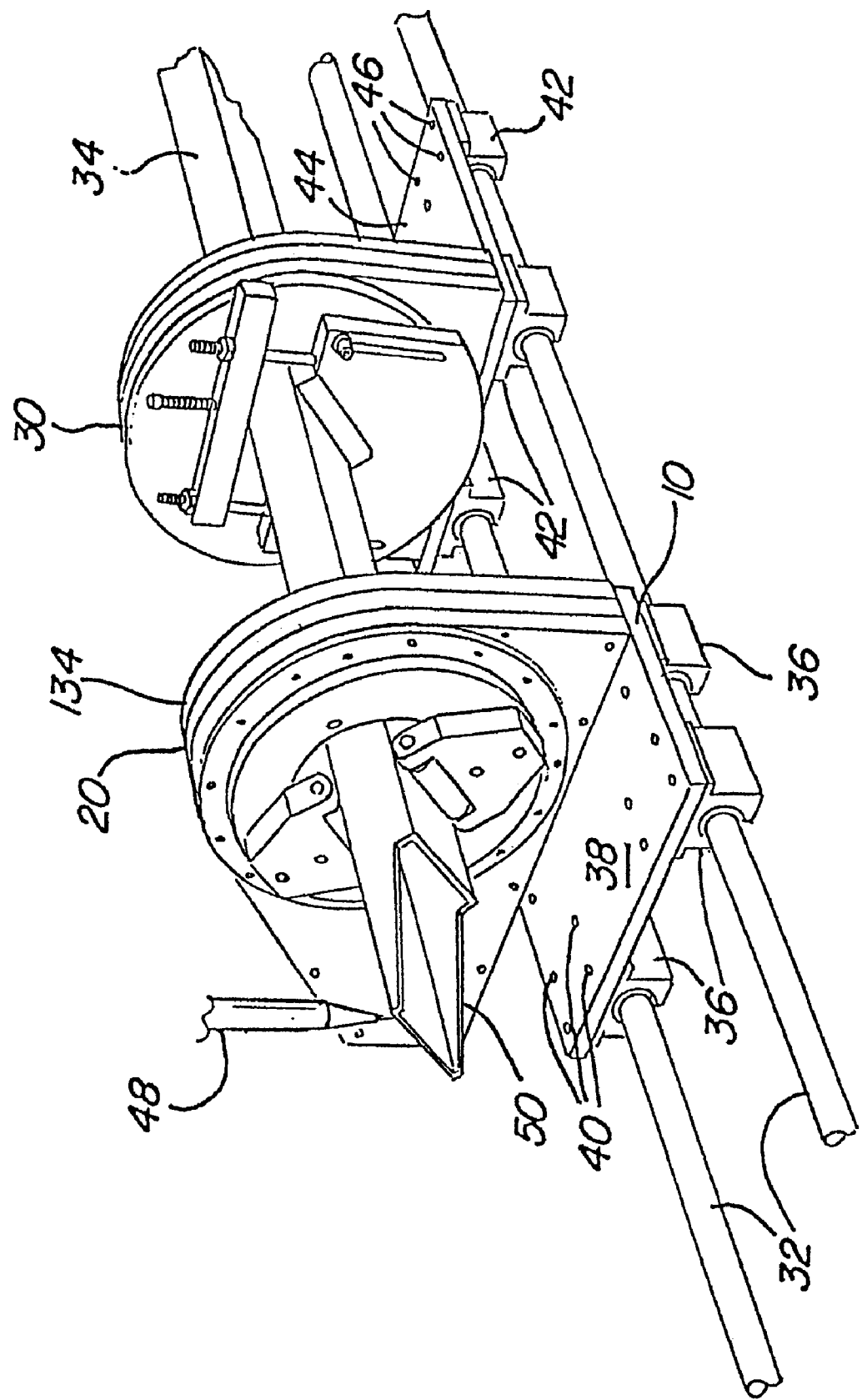
FIG. 1 is a perspective view of the driver carriage and follower carriage of the present invention.

Illustrated in FIG. 1 is a perspective view of a preferred embodiment for a clamping apparatus for general shaped tubing comprising a driver carriage 20, a follower carriage 30, each supported on a pair of guide rails 32 to permit smooth translation in a longitudinal direction. Driver carriage 20 includes a base plate 38 and a set of rail guides 36 mounted thereunder, and follower carriage 30 also includes a base plate 44 and rail guides 42. Rail guides 36,42 may be secured by fasteners 40, 46 or may be mounted to their respective base plates by welding or other established fastening means. Both the driver carriage 20 and the follower carriage 30 have mechanisms which are described in detail below for securing a tubular specimen 34 therein, and the assembly both slides longitudinally (i.e., in the direction of the guide rails 32) and rotates in such a manner as to position the tubular specimen 34 in a predetermined cutting position with respect to a cutting instrument 48. Cutting instrument 48 may be a plasma torch, laser, or other high intensity instrument for precision cutting of metal tubings.

The cutting of the tubing specimen 34 into a coped configuration such as the one shown in FIG. 1 is achieved by simultaneously rotating the tubular specimen while shifting the specimen longitudinally so that the end 50 is moving with respect to the cutting instrument 48. In order to achieve the desired cut, the rotation of the tubular specimen 34 must be precisely centered along a longitudinal axis else the rotation of the tubular specimen will not be consistent and the cut will be flawed. It is a simple matter to center a tubing specimen having a circular cross-section because once a diameter is secured the tubing is automatically centered. That is, circular tubing is by definition centered once the axis of rotation is aligned with the center of the circular cross section. Rectangular tubing cannot be centered in this manner, and the prior art lacks a clamping apparatus for securing and centering non-circular tubing for the operation previously described. The present invention solves this dilemma.

Figure 2:
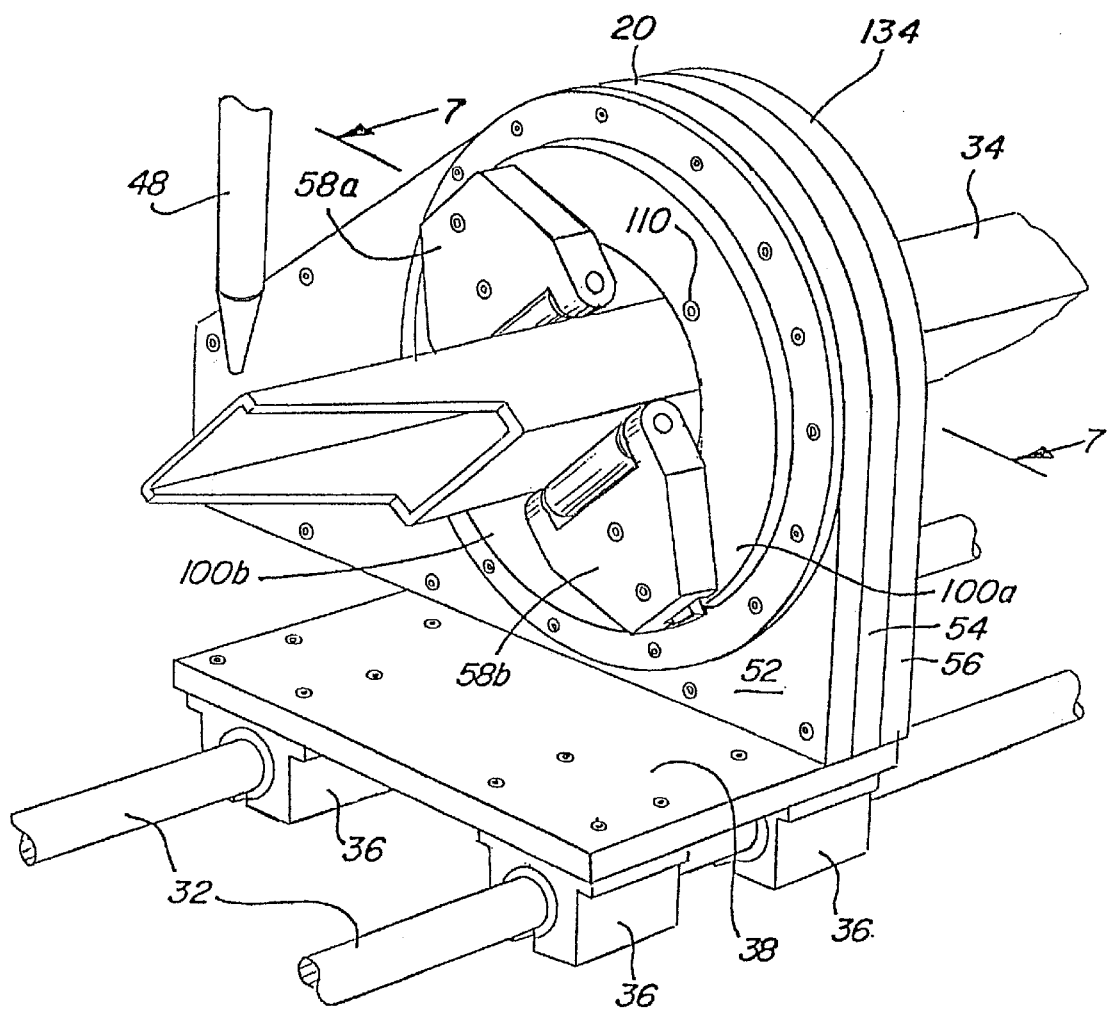
FIG. 2 is a perspective view of the driver carriage and first pair of rollers.
Figure 3:
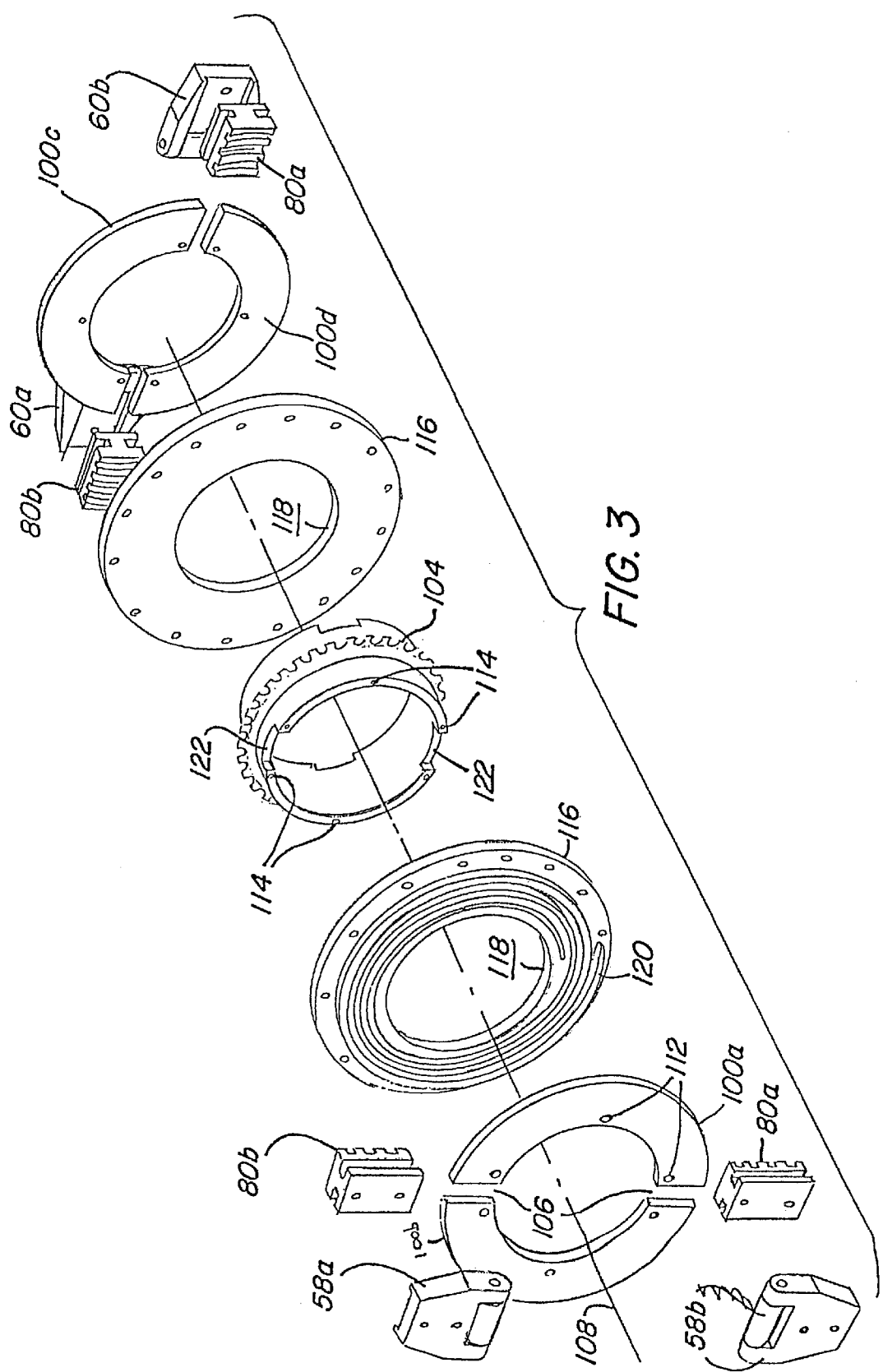
FIG. 3 is an exploded view of the driver carriage without the housing.

FIGS. 2 and 3 illustrate the drive carriage 20 in perspective and exploded views, and the following description is directed to these figures in combination. The base plate 38 supports a vertical housing 134 comprising end plate 52, spacer plate 54, and end plate 56. The housing 134 has an opening thereinthrough which is sized to receive the largest cross-sectional tubing anticipated for this particular clamping apparatus. As can be appreciated, various sized housings can accommodate different sized tubing to meet the user's specific needs. The clamping system on the driver carriage will now be described in detail.

On both sides of the housing's opening are a pair of opposed roller guides 58a, 58b, 60a, 60b, with each roller guide mounted across the housing's opening from the corresponding other roller guide comprising the pair. For example, FIG. 2 illustrates roller guide 58a mounted on a first side of the housing opening and its corresponding roller guide 58b is mounted in opposing position across the opening. As described further below, the roller guides 58a and 58b operate in concert in a radial direction like a pair of jaws to grip and center the tubing along a predetermined axis. Roller guides 60a and 60b are preferably mounted in such a manner so as to operate in a radial direction along the same predetermined axis but perpendicular to roller guides 58a and 58b. This is shown in FIG. 3 and allows a rectangular tubing to be centered on two orthogonal axes of symmetry. Furthermore, each pair of roller guides are mounted such that they are always equal distance from an axis of rotation 108, which necessarily centers a tubing specimen between the roller guides.

Each roller guide (denoted generally as 58 in FIG. 4) includes a cylindrical roller 62 which is rotationally mounted between two lugs 70,76 using pin 64. Pin 64 passes through hole 72 of lug 70, into hole 74 of roller 62, and through hole 78 of lug 76, and the tolerance between the hole 74 in the roller 62 and the diameter of the pin 64 allows for free rotation of the roller 62 about the pin 64. The pin 64 may be press fit between the lugs 72,76, or secured in some other conventional manner. When a rectangular tubing specimen is placed between a pair of roller guides, a constraining force is applied by the radial movement of the roller guides while the rollers, which contact the tubing, permit the tubing to travel along the longitudinal axis. The constraining nature of the roller guides' pressure on the tubing element ensures that the tubing element will remain centered with respect to a plane between the two roller guides.

Figure 4:
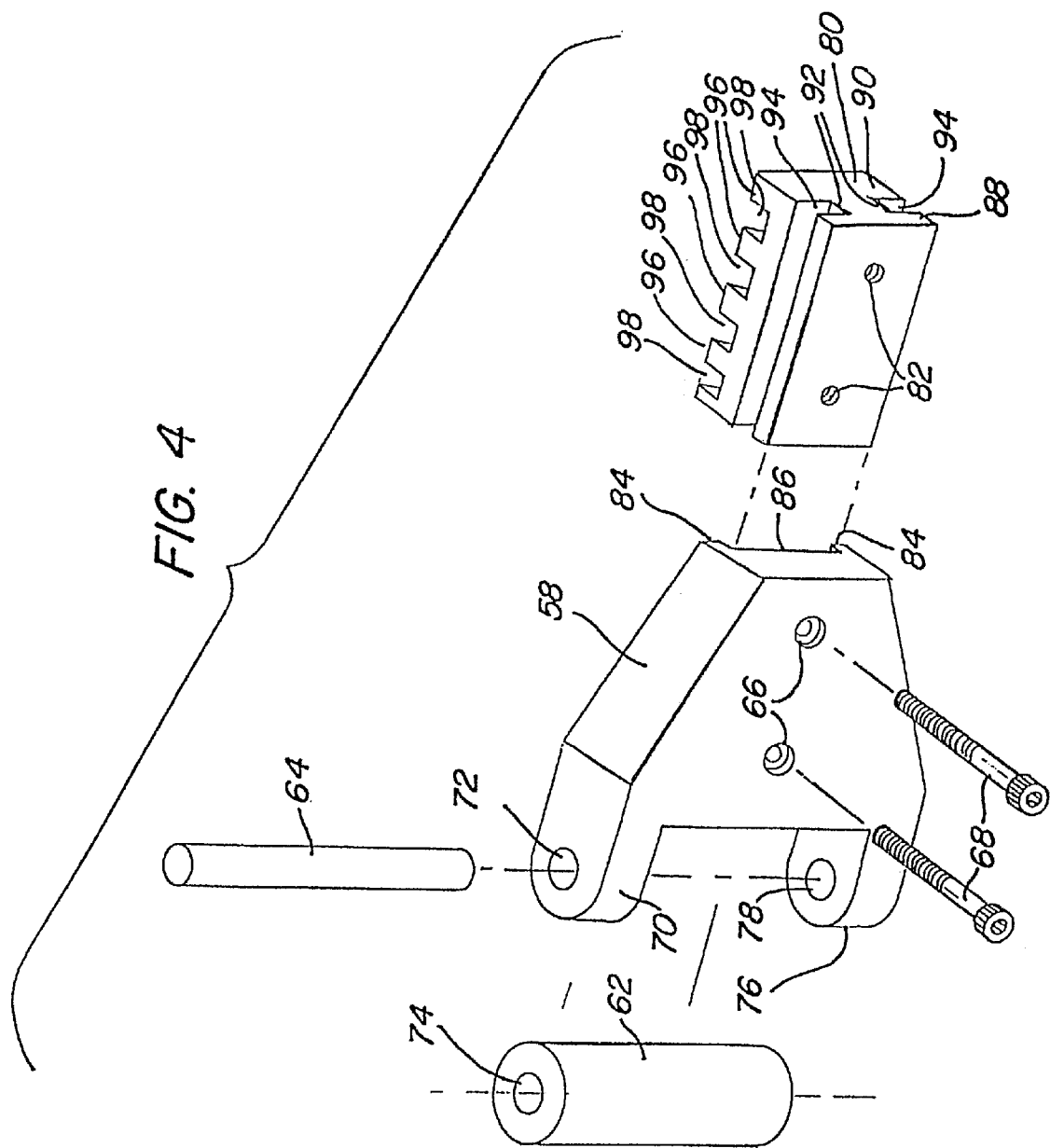
FIG. 4 is an exploded view of the roller and roller guide assembly.

Each roller guide 58, 60 is mounted to a jaw chuck 80 using bolts 68 as shown in FIG. 4. Each bolt passes through roller guide holes 66 and into tapped jaw chuck holes 82 to secure the assembly together. Roller guide leg members 84 define a slot 86 which is adapted to seat jaw chuck 80 and position the jaw chuck 80 in the center of the roller guide. Jaw chuck 80 comprises a base plate 88 connected to an engagement plate 90 by web 92, which also serves to define lateral gaps 94 in the jaw chuck 80. Jaw chuck 80a is slightly longer than jaw chuck 80b for reasons which will become apparent below. The engagement plate 90 comprises along an outer surface a series of rectangular teeth members 96 separated by rectangular gaps 98. The roller guides 58,60, roller 62, and the jaw chucks 80 are preferably cast or machined of steel to provide the necessary strength and durability required of the present application.

Each side of the housing further includes a pair of semi-circular jaw guides 100 mounted to a sprocket 104 which is located within the housing 134. Each pair of jaw guides 100 are mounted to form a discontinuous circle with a spacing 106 between the ends which corresponds to the width of the web 92 of the jaw chuck 80. The spacing 106 between the jaw guides 100 defines a radial track for the jaw chucks 80 to move between. If the jaw guides 100 are mounted such that they are centered about a designated longitudinal centerline 108 serving as the axis of rotation, then the jaw chucks 80 and roller guides 58,60 will operate radially along the cylindrical coordinate system and ensure that the tubing element will be centered about the axis of rotation 108.

Figure 5:
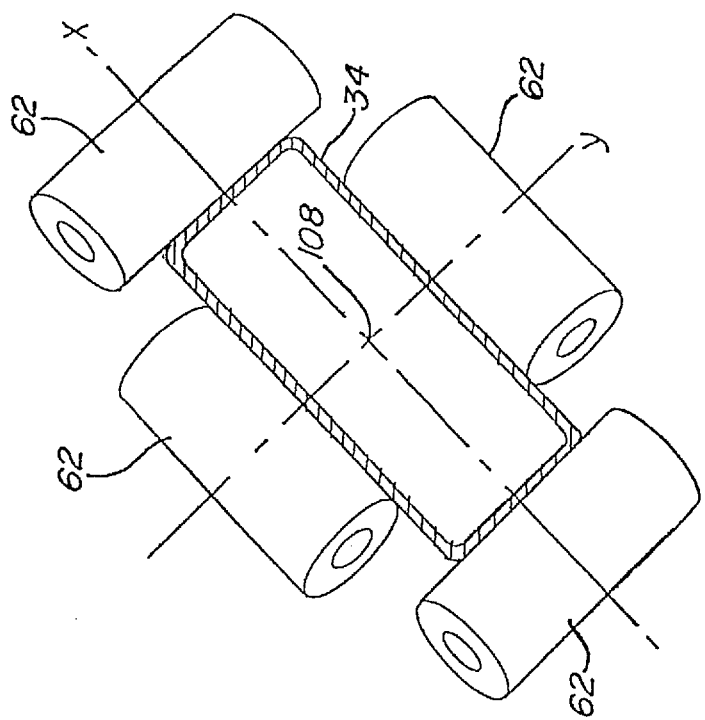
FIG. 5 is a cross sectional view of a rectangular tubing constrained by both pair of rollers.

Jaw guides 100 are mounted to the sprocket 104 using conventional fastening means such as three fasteners 110 which pass through holes 112 and into sprocket holes 114. As discussed below, the sprocket is rotatably driven by a motor, which in turn rotates guide plates 100 and jaw chucks 80 mounted between said jaw guides 100, which in turn rotates roller guides 58, 60 and the tubing specimen clamped therein. Adjacent each pair of jaw guides 100 is a circular scroll plate 116 having an inner hole 118 which receives the tubing specimen, and a convolute pathway defined by a spiral element 120 which circles the scroll plate 116 as shown in FIG. 3. The spacing between successive passes of the spiral element 120 and the width of the spiral element 120 corresponds with the gaps 98 and the width of the teeth members 96 of the jaw chucks 80 such that the jaw chucks 80 mesh flush with the scroll plate 116. The significance can be appreciated when one considers the effect of rotating the scroll plate 116 while holding the jaw guides 100 fixed. The convolute pathway forces the jaw chucks 80 to converge radially when the scroll plate 116 is rotated in a first direction, and expand radially when the scroll plate 116 is rotated in the opposite direction. Thus, by rotating each scroll plate 116 until the roller guides 58, 60 and corresponding rollers 62 are in contact with the sides of a tubing specimen, the tubing specimen 34 can be accurately positioned so as to be centered on the axis of rotation 108. This is illustrated in FIG. 5 with both pair of rollers shown in the same plane and the lines of force coincident with the x-y axes, although it is to be understood that in the preferred embodiment each pair of rollers will be disposed on opposite sides of the housing 134 as shown in FIG. 3.

Once the scroll plate 116 has been rotated into the proper position in order to secure the tubing specimen, the scroll plate 116 is locked to the adjacent end plate using a locking screw, key chuck, or other known means for releasably securing the two plates, thus preventing the scroll plate 116 from inadvertently rotating out of alignment. With the jaw chucks 80 engaged in the convolute pathway of the scroll plate 116, a user can easily center a tubing specimen by rotating the scroll plate 116 in the proper direction until the roller guides 58,60 constrain the tubing specimen in the direction of the two pairs of converging roller guides. When both pair of roller guides are in contact with a rectangular tubing specimen, the specimen will be fully constrained and, furthermore, will be centered on the axis of rotation 108. In order for the jaw chucks 80 to center the roller guides 58,60, one jaw chuck must be slightly longer to account for the offset in the convolute path as it travels 180° from one side to the other. This offset occurs because the spiral member 120 is closer to the centerline 108 as it travels around the convolute path and the roller guides 58,60 would be similarly offset unless this difference was accounted for. This difference is determined before hand so that the correct size jaw chucks 80a, 80b will exactly center the roller guides 58,60 about the geometric center of the scroll plate 116 (coinciding with the axis of revolution 108), which also serves to center the jaw guides 100.

Figure 6:
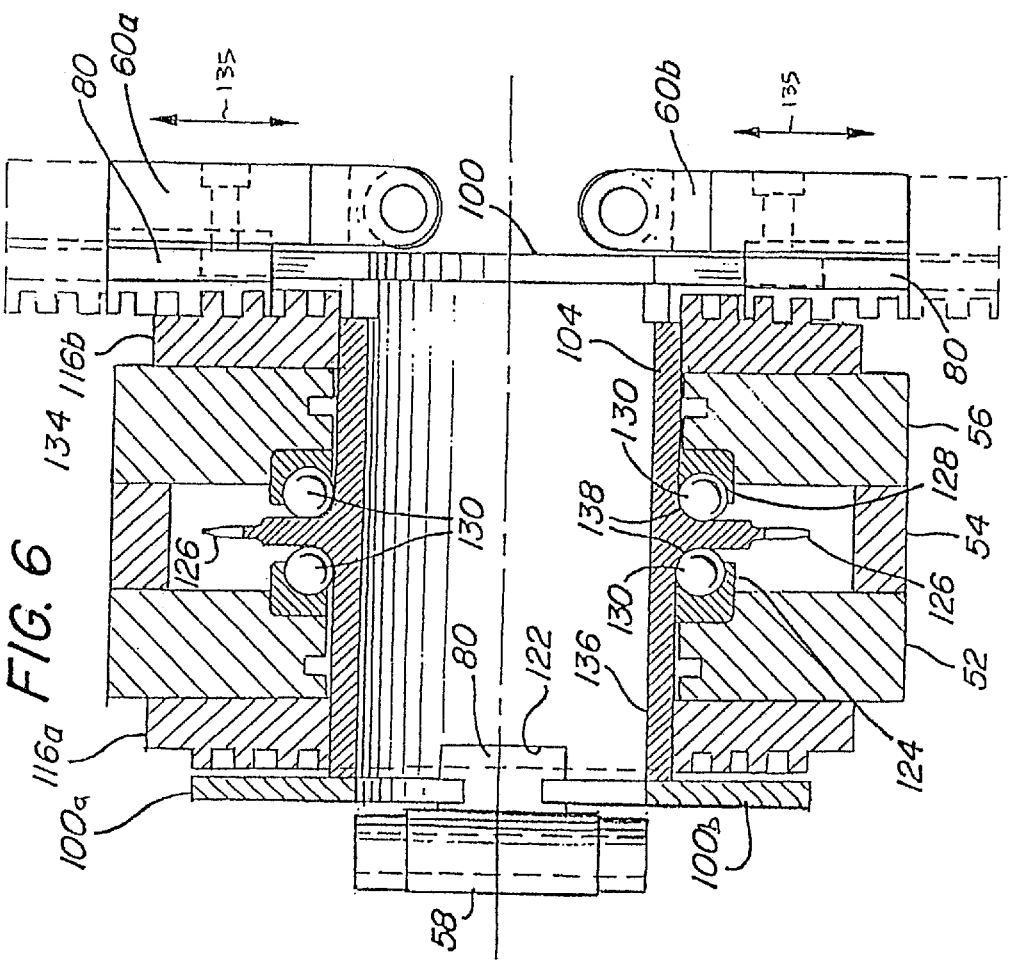
FIG. 6 is a sectional view of the housing and driver carriage assembly.

The housing 134 is shown in cut away in FIG. 6, which comprises from left to right roller guide 58, jaw chuck 80 mounted to roller guide 58 and also secured in sprocket 104 within slot 122. Jaw guides 100a, 100b are disposed in the jaw chucks lateral slots 94 and mounted to the sprocket 104 using fasteners (not shown). Scroll plate 116a is mounted between the jaw guides 100 and end plate 52, and is journaled on the sprocket's hub 136. End plate 52 is rigidly mounted to base plate 38 and includes a circular aperture with an outer bearing race 124 located therein which permits the sprocket 104 to rotate freely within the end plate 52. Spacer plate 54 separates the two end plates 52, 56 and provides clearance for the teeth 126 of the sprocket 104. As with end plate 52, end plate 56 includes an outer bearing race 128, and a plurality of ball bearings 130 are operably disposed within each outer bearing race and the neck 138 of the sprocket 104 forming a circumferential lip to facilitate smooth rotation of the sprocket 104 within the housing 134. The housing 134 of the driver carriage 20 is similar on the right hand side except as shown the elements have been rotated about the centerline 90 degrees. Scroll plate 116b is adjacent plate 54, and jaw guide 100 is shown partially in phantom inside jaw chucks 80, and roller guides 60a,b are positioned on the extreme outside of the housing 134. The direction of roller guides 60a,60b and jaw chucks 80 are shown by arrows 135.

Figure 7:
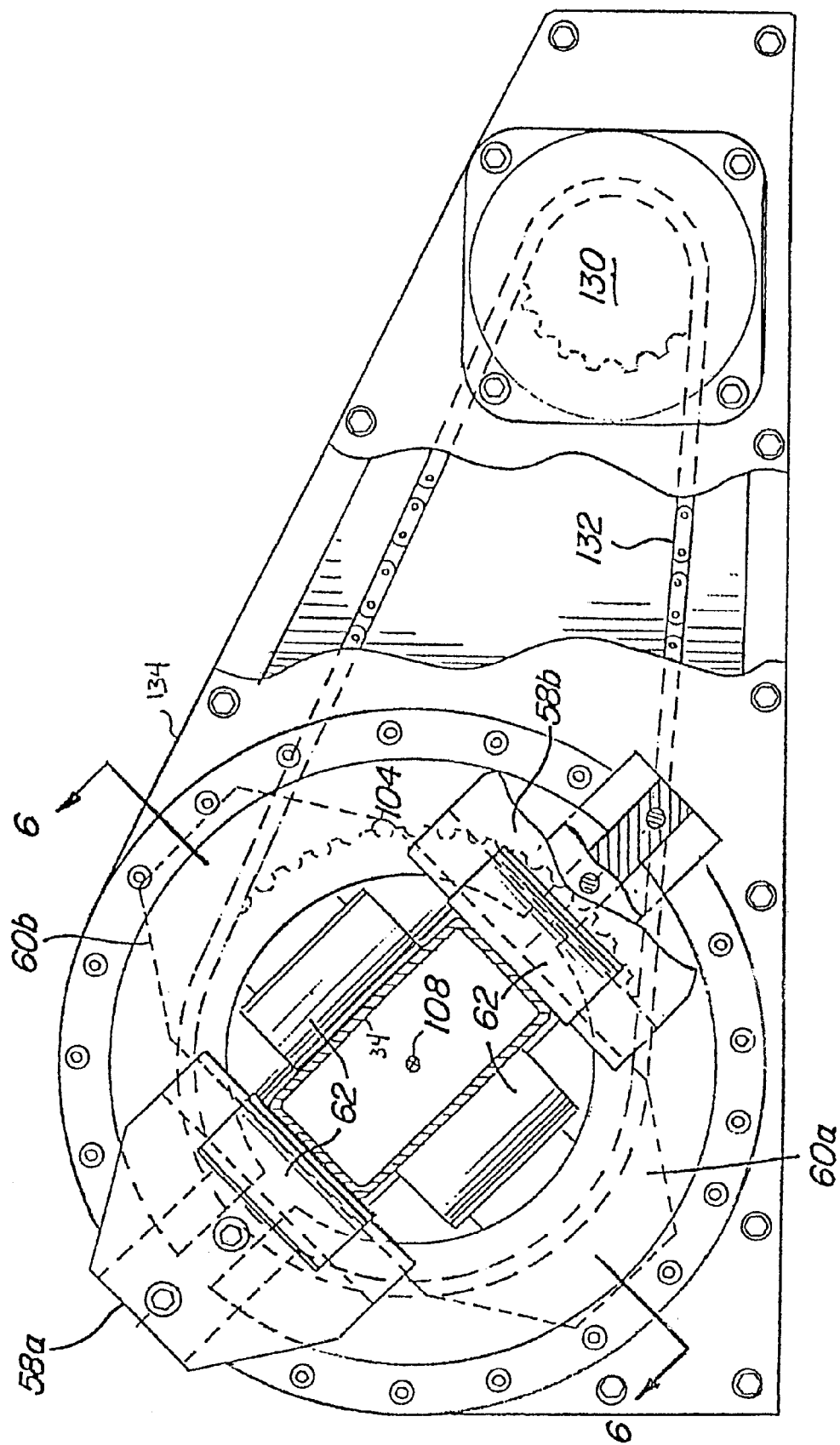
FIG. 7 is a side view partially in phantom of the gear and sprocket cooperation.

FIG. 7 illustrates the positioning of the motor and drive assembly with respect to the drive carriage 20 and housing 134. A motor (not shown) such as Model Number M2-4247-S made by Intelligent Motion Systems of Taftville, Conn. is placed adjacent the housing 134 with a gear box connected to gear 130 (shown in phantom), which is rotatably mounted in the housing. Chain 132 is operably mounted to said gear 130 and transmits a force to sprocket 104 causing it to rotate within the housing. By operating the motor according to a predetermined program in which the desired cut and dimensions of the tubing are input, the motor can cooperate with the drive carriage 20 to accurately position the edge of the tubing adjacent the cutting instrument to produce the desired coped configuration. FIG. 7 further illustrates the relationship between the pairs of roller guides and rollers, with each pair serving to fix the tubing 34 in a perpendicular direction while permitting longitudinal movement in the direction of the axis of rotation. When the motor rotates the sprocket 104, the entire tubing 34 is rotated about the axis of rotation 108 which corresponds to the cross sectional center of the tubing 34. In one preferred embodiment, the follower carriage 30 has means for positioning the tubing in the longitudinal direction, such as a fixed clamping mechanism for securing the tubing and a motor for driving the follower carriage translationally, which is programmed in conjunction with the motor in the drive carriage for rotation, such that the product of the rotation and the translation place the tubing end at the cutting instrument to achieve the desired cut. Although a tubing of rectangular cross section is shown, it can be seen that tubing of general cross section can be secured between the orthogonal pairs of roller guides, and that tubing having a shape with two axes of symmetry can be centered on the axis of rotation of the clamping apparatus. Therefore, the present invention is adaptable to clamp and perform machining on a wide variety of tubing cross sections.

Figure 8:
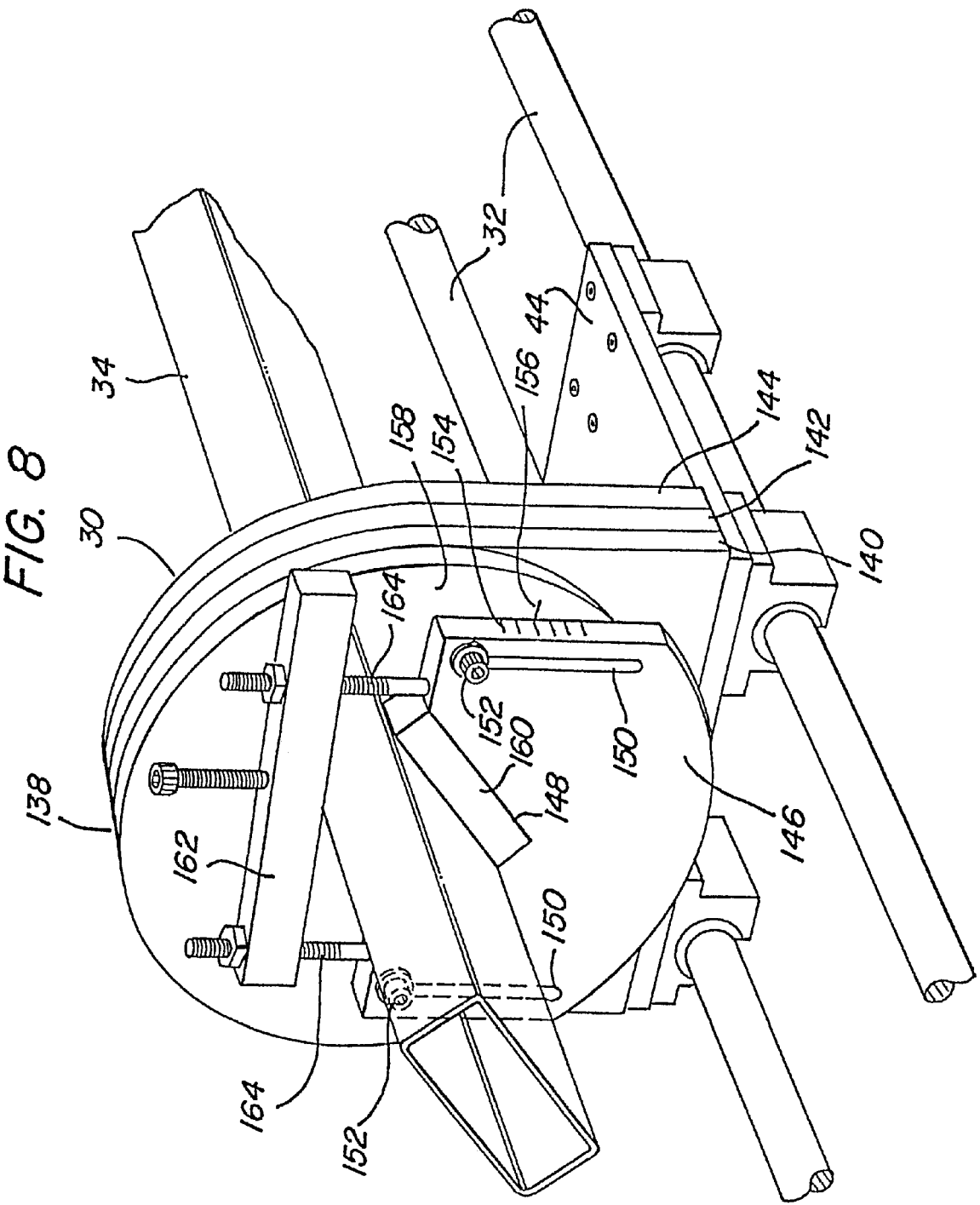
FIG. 8 is an oblique view of the follower carriage.

Turning now to the follower carriage 30, FIG. 8 illustrates base plate 44 supporting housing 138 comprising end plate 140, spacer plate 142, and end plate 144 similar to the driver carriage configuration. However, unlike the driver carriage 20 the follower carriage clamping mechanism fixes the tubing specimen 34 in the longitudinal direction so that when the follower carriage moves along guide rails 32 the tubing specimen 34 is moved an identical distance. This allows the follower carriage 30 to position the end of the tubing specimen 34 in the proper position with respect to the cutting tool 48 as shown in FIG. 1. A motor (not shown) is connected to base plate 44 and drives the base plate along the guide rails 32 in accordance with a preprogrammed set of instructions coordinated with the program driving the rotational motor in the drive carriage 20.

In the alternative, when the driver carriage 20 is movable along the rails 32, the follower carriage 30 position is constant. The cutting tool 90, in such case, will be mounted for lateral movement with the driver carriage 20, effectively bringing the cutting tool to the point along the length of the tube 34 to be worked.

Figure 9:
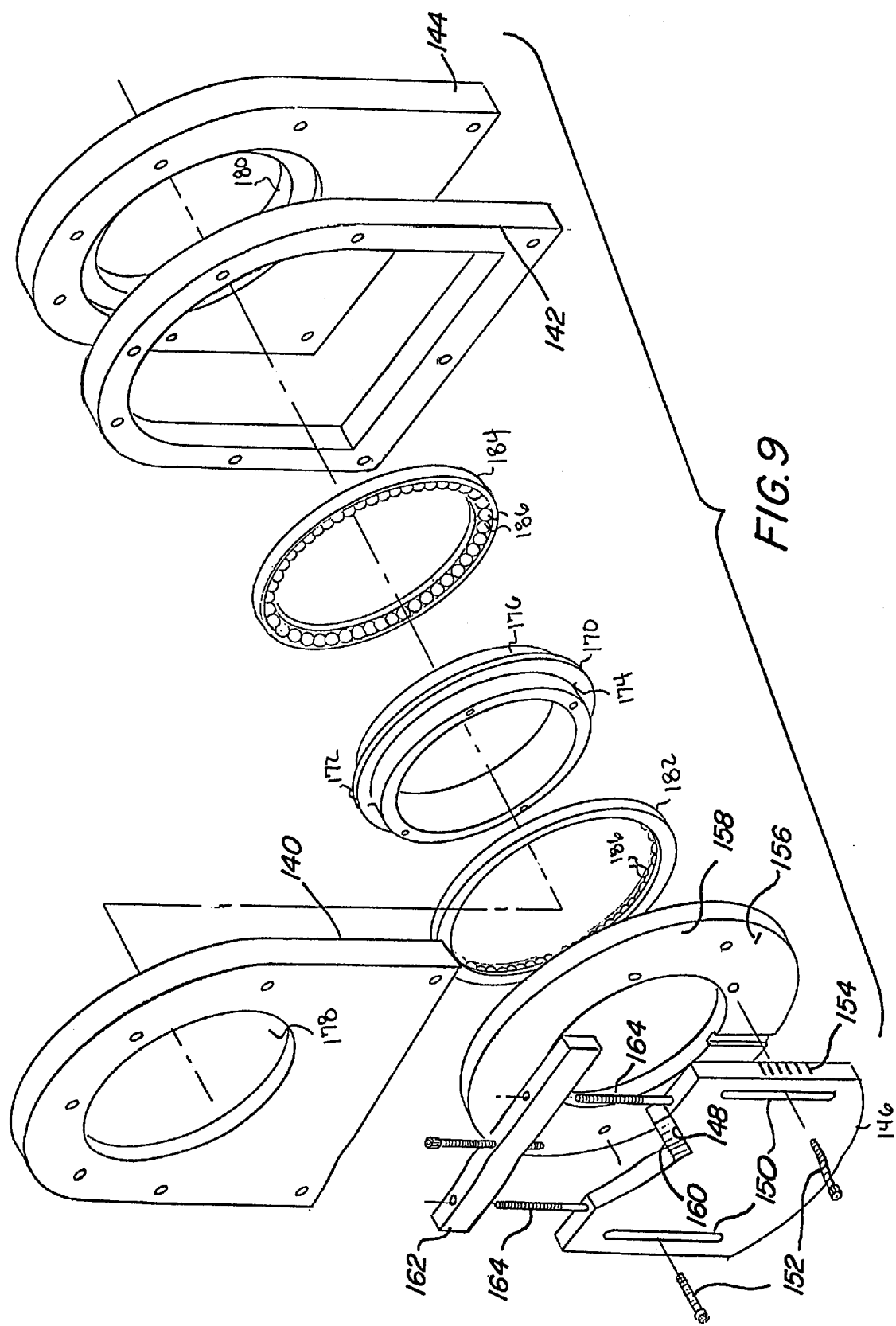
FIG. 9 is an exploded view of the follower carriage.

Viewing FIGS. 8 and 9 in combination, on a front side of the housing 138 is a support plate 146 mounted thereto with a V-shaped opening 148 along a top surface. The support plate 146 can be raised or lowered with respect to the housing 138 using a pair of slotted tracks 150 and a pair of fasteners 152. By raising or lowering the support plate 146, a rectangular tubing specimen can be accurately centered with respect to the axis of rotation. Indicia 154 can preferably be used in conjunction with indicia 156 on a rotatable disk 158 to properly set the height of the support plate 146 with respect to the rotatable disk 158 for known tubing sizes. Tubing specimen 34 is seated in the V-shaped opening 148 support plate 146 with a removable chuck 160 placed in the V-shaped opening. The thickness of the removable chuck 160 is dependent upon the size of the tubing specimen, and different sized chucks 160 are used to center different sized tubing. The support plate 146 further comprises a traverse member 162 which can be tightened onto the tubular member using threaded rods 164. With the traverse member 162 tightly secured to the tubular specimen 34, longitudinal movement of the tubular specimen 34 with respect to the follower carriage 30 is prevented. Thus, the longitudinal movement of the follower carriage 30 defines the longitudinal movement of the tubular specimen 34 through the driver carriage 20 and adjacent the cutting instrument 48 (see FIG. 1).

In order for the follower carriage 30 to permit rotation of the tubular specimen 34, the support plate 146 and the rotatable disk 158 must be allowed to rotate freely about the centerline of the tubing, i.e., the axis of rotation 108. A circular hub 170 having an outer circumferential lip 172 defining left and right inner bearing races 174,176 is rotatably mounted in the housing 138. End plates 140, 144 separated by spacer plate 142 each include circular holes 178,180 respectively, where each hole includes a circular recess which seats outer bearing races 182,184. The assembly includes a plurality of ball bearings 186 which permit the circular hub 170 to rotate freely inside the housing 138. With support plate 146 mounted to rotatable disk 158, which in turn mounts support plate 146, the clamping assembly can rotate with respect to the housing 138. Other means for permitting rotation are possible, and those skilled in the art will appreciate the various methods without limiting the scope of the invention to a single embodiment. The follower carriage 30 similarly may have different means for securing the tubular specimen such as opposed V-shaped members or a plurality of pressure bolts at various angles to secure the tubing.

It will be understood that although the function of rotation and translation have been specifically described as being performed by the driver carriage and the follower carriage, respectively, it can easily be appreciated that the functions can be switched or one carriage could perform both functions. That is, either the drive carrier or the follower carrier could rotate or translate the tubing and still adhere to the principles of the present invention. Only the appropriate motor and linkages described herein are required, and thus each combination is asserted to be an embodiment of the present invention. The embodiments described herein are merely exemplary and a person skilled in the art may make variations and modifications without departing from the spirit and scope of the invention. All such variations and modifications are intended to be included within the scope of the invention as defined in the appended claims.

What is claimed is:

1. A clamping apparatus for an elongate tubing comprising:
    a base having an aperture sized to receive the tubing therethrough;
    a first pair of opposed jaws mounted to said base adjacent the aperture with each jaw disposed on an opposite side thereof, said first pair of opposed jaws rotatable as a unit about a longitudinal axis of the tubing;
    means for simultaneously opening said first pair of jaws and for simultaneously closing said first pair of opposed jaws, said pair of jaws continuously centered about said longitudinal axis of the tubing;
    a second pair of opposed jaws mounted to said base adjacent the aperture with each jaw disposed on an opposite side thereof; said second pair of opposed jaws rotatable as a unit about the longitudinal axis of the tubing; and
    means for simultaneously opening said second pair of jaws and for simultaneously closing said second pair of opposed jaws, said second pair of jaws continuously centered about the longitudinal axis of the tubing.

2. The clamping apparatus as recited in claim 1 wherein a line of force between the first pair of opposed jaws is not parallel to a line of force between the second pair of opposed jaws.

3. The clamping apparatus as recited in claim 2 wherein the line of force between the said first pair of opposed jaws is perpendicular to the line of force between the second pair of opposed jaws.

4. The clamping apparatus as recited in claim 3 wherein said first and second pair of opposed jaws each include roller means rotationally mounted to each jaw for securing said tubing in a lateral direction while permitting movement of said tubing in a longitudinal direction through said aperture, whereby cooperation of said first pair of opposed jaws and included roller means and said second pair of opposed jaws and included roller means limit movement of said tubing to translational movement in the longitudinal direction and rotation about the rotational axis.

5. The clamping apparatus as recited in claim 4 wherein said first pair of opposed jaws is operably mounted at a first opening of the aperture on said base and the second pair of opposed jaws is operably mounted at a second opening of the aperture on said base.

6. The clamping apparatus as recited in claim 5 wherein said base comprises first and second endplates, and first and second annular scroll plates rotationally mounted on outer sides of said first and second endplates, respectively, each said scroll plate further comprising:
    a convolute track centered about said axis of rotation on a side opposite the mounted endplate; and
    wherein said first pair of opposed jaws are slidably mounted in said track on said first scroll plate, each jaw aligned with respect to said axis of rotation such that rotation of said first pair of jaws about said axis of rotation within said track converges said first pair of opposed jaws symmetrically with respect to said axis of rotation, and
    wherein said second pair of opposed jaws are slidably mounted in said track on said second scroll plate, each jaw aligned with respect to said axis of rotation such that rotation of said second pair of jaws about said axis of rotation within said track converges said second pair of opposed jaws symmetrically with respect to said axis of rotation.

7. The clamping apparatus as recited in claim 6 wherein said first and second endplates and said first and second annular scroll plates are each mounted on a cylindrical hub within said base, said cylindrical hub having a longitudinal axis along said axis of rotation, and said first and second scroll plates rotatable about said cylindrical hub.

8. The clamping apparatus as recited in claim 7 further including a motor, and wherein said cylindrical hub includes an outer sprocket operably mounted to chain means connected to said motor for driving said cylindrical hub rotationally about said axis of rotation.

9. The clamping apparatus as recited in claim 7 further comprising first and second annular outer races disposed axially within said first and second end plates respectively, and bearing means between said cylindrical hub and said first outer race, and between said cylindrical hub and said second outer race for facilitating rotation of said cylindrical hub within said end plates.

10. The clamping apparatus as recited in claim 9 further comprising:
    first and second jaw chucks operably mounted to one each of said first pair of opposable jaws, respectively, and third and fourth jaw chucks operably mounted to one each of said second pair of opposable jaws, respectively, said first and second jaw chucks each engaging the convolute track on said first scroll plate and wherein rotation of said first and second jaw chucks about said axis of rotation in a first direction causes said first pair of opposed jaws to close together, and rotation of said first and second jaw chucks about said axis of rotation in an opposite direction causes said first pair of opposed jaws to open together, and said third and fourth jaw chucks each engaging the convolute track on said second scroll plate and wherein rotation of said third and fourth jaw chucks about said axis of rotation in a first direction causes said second pair of opposed jaws to close together, and rotation of said third and fourth jaw chucks about the axis of rotation in an opposite direction causes said second pair of opposed jaws to close together.

11. The clamping apparatus as recited in claim 10 further comprising first and second semicircular jaw guides mounted to said cylindrical hub adjacent said first scroll plate and centered about said axis of rotation, said first and second semicircular jaw guides each having ends mating with said first and second jaw chucks to define a radial path therebetween, the first and second jaw guides and first and second jaw chucks mating to form a continuous ring centered about the axis of rotation, said first jaw chuck and said second jaw chuck positioned equally distant from said axis of rotation, and further comprising third and fourth semicircular jaw guides mounted to said cylindrical hub adjacent said second scroll plate and centered about said axis of rotation, said third and fourth semicircular jaw guides each having ends mating with said third and fourth jaw chucks to define a radial path therebetween, the third and fourth jaw guides and third and fourth jaw chucks mating to form a continuous ring centered about the axis of rotation, said third jaw chuck and said fourth jaw chuck positioned equally distant from said axis of rotation.

12. The clamping apparatus as recited in claim 11 further comprising a mounting bracket for each jaw of said first and second pair of opposing jaws, said mounting bracket comprising means for connecting said mounting bracket to one of said jaw chucks, and journalling means for rotatably mounting a roller therein.

13. The clamping apparatus as recited in claim 12 further comprising a spacing plate disposed between said first end plate and said second end plate.

14. The clamping apparatus as recited in claim 13 wherein said base is slidably mounted along a track.

15. The clamping apparatus as recited in claim 1 further comprising a tubing securing means longitudinally spaced from said base for gripping said tubing, said tubing securing means comprising:

V-shaped block means for receiving said tubing thereon; and retention means cooperating with said V-shaped block means for releasably securing said tubing in said V-shaped block means.

16. The clamping apparatus as recited in claim 15 wherein said tubing securing means is slidable in the longitudinal direction relative to said base and wherein a sliding of said tubing securing means causes tubing constrained therein to move through said aperture in said base between said first and second pair of opposing jaws.

17. The clamping apparatus as recited in claim 16 wherein said retention means comprises a traverse bar mounted over said V-shaped block means and means to raise and lower said traverse bar onto said tubing to release and secure said tubing, respectively.

18. The clamping apparatus as recited in claim 17 wherein said V-block means is vertically adjustable to accommodate various size tubing diameters.

19. The clamping apparatus as recited in claim 18 wherein said retention means further comprises scaled indicia means for setting said V-block at a predetermined radial position.

20. An elongate tubing mounting apparatus for radially securing tubing of a general cross-section and permitting longitudinal movement of said tubing through said mounting apparatus, said mounting apparatus comprising:

a cylindrical inner hub having circumferential lip generally disposed midway along said cylindrical inner hub on an outer surface thereof and further having an inner diameter sized to receive said elongate tubing thereinthrough;

first and second annular races rotationally mounted on said inner hub adjacent said circumferential lip, said first and second annular races including bearing means disposed between said annular races and said inner cylindrical race for facilitating rotation of said inner cylindrical inner hub within said annular races;

first and second end plates, each having an aperture sized to receive said cylindrical inner hub therethrough, said first and second end plates further including a recess about said aperture on an inner surface and sized to receive said one of said first and second annular races therein whereby said cylindrical inner hub is rotatable with respect to said first and second end plates;

first and second scroll plates, each having an aperture sized to receive said cylindrical inner hub thereinthrough and each scroll plate disposed adjacent one of said first and second end plates at an outer surface therof, said first and second scroll plates each comprising a convolute track spiraling around said aperture form a maximum radial position with respect to a centerline of said aperture to a minimum radial position with respect to the centerline;

first and second pair of jaw chucks, each having a first surface engaging with one of said convolute tracks of said first and second scroll plates and further having lateral slots extending along first and second sides thereof;

first and second pair of semicircular jaw guides, each pair of jaw guides mounted to an opposite end of said cylindrical inner hub and each jaw guide of said pair of jaw guides spaced apart by a gap, said gap sized to receive one of said first and second pair of jaw chucks therebetween with one end of each jaw guide seated in said lateral slot of said jaw guide whereby said first pair of jaw guides and siad first pair of jaw chucks form a continuous ring adjacent siad first scroll plate, and said second pair of jaw guides and said second pair of jaw chucks form a continuous ring adjacent said second scroll plate; and first and second pair of roller mounts, each roller mount connected to a jaw chuck an movable therewith and each roller mount comprising a roller rotatably mounted thereon.

21. A system for supporting and moving an elongate tubing having a general cross-section for operation on said tubing, said system comprising a translational drive support unit movable along a track and adapted to rigidly secure the tubing therein causing the tubing to move with the translational drive support in the direction of the track, and a support unit spaced from said translational drive support on said track, the support unit securing the tubing in lateral and vertical directions while permitting the tubing to move longitudinally therein in accordance with a motion of the translational drive support whereby the system in conjunction with an operation station performs an operation on said tubing, said system comprising:

the translational drive support unit having means for rigidly securing an elongate tubing of general cross-section thereto, and further comprising locomotion means for moving said tubing back and forth with respect to an operation station; and the support unit comprising:

a base having an aperture sized to receive the tubing therethrough;

a first pair of opposed jaws mounted to said base adjacent the aperture, said first pair of opposed jaws having means to close each jaw into contact with said tubing, and roller means connected to each jaw for constraining the tubing in the direction of the movement of the jaws and for permitting movement longitudinally through the first pair of opposed jaws; and a second pair of opposed jaws mounted to said base adjacent the aperture, said second pair of opposed jaws having means to close each jaw into contact with said tubing, and roller means connected to each jaw for constraining the tubing in the direction of the movement of the jaws and for permitting movement longitudinally through the second pair of opposed jaws.

22. The system for supporting and moving a tubing as recited in claim 21 wherein said first pair of opposed jaws is mounted on a first side of said base, and the second pair of opposed jaws is mounted on an opposite side of said base, and wherein said second pair of opposed jaws operates in a perpendicular direction to said first pair of opposed jaws.

23. The system for supporting and moving a tubing as recited in claim 22 wherein said means for closing said first pair of opposed jaws and said second pair of opposed jaws each comprises:

a scroll plate rotatably mounted within said base and having a convolute track for receiving one of said pair of opposed jaws, said scroll plate converging and separating said jaws symmetrically as said scroll plate is rotated in first and second directions, respectively.

* * * * *